Patented June 11, 1929.

1,716,476

UNITED STATES PATENT OFFICE.

RALPH W. AUSTIN, OF QUINCY, MASSACHUSETTS.

FIRE-EXTINGUISHING LIQUID.

No Drawing. Application filed July 18, 1925. Serial No. 44,530.

This invention relates to an extinguishing liquid for fire extinguishers, and has for an object to provide an extinguishing liquid of novel composition having properties which render it particularly useful as the extinguishing liquid of anti-freezing fire extinguishers, and which possesses no tendency to corrode the metal containers comprising the casing of the extinguisher.

Calcium chloride solution has heretofore been extensively employed as an extinguishing liquid for fire extinguishers, but because of its acidic nature, solutions made from the commercial grade of calcium chloride obtainable on the market, possess a severe corrosive action on the metal comprising the body or casing of the extinguisher within which the extinguishing liquid is contained. Attempts have been made to diminish this corrosive action by the use of asphalt paints on the interior of the copper container comprising the usual casing of the extinguisher and also by tin-plating the interior of the same. Neither method has proven satisfactory and the use of calicum carbonate in the calcium chloride solution has been resorted to in the attempt to overcome the acidic nature of the calcium chloride solution and to thereby decrease its corrosive action. The solubility of the calcium carbonate decreases rapidly with the temperature and its use for particularly this reason has not proven satisfactory in anti-freezing extinguishers for use in colder climates.

I have discovered that the corrosive action of calcium chloride solutions may be diminished to a minimum and practically overcome entirely, by a calcium chloride solution having potassium carbonate dissolved therein. In the manufacture of those fire extinguishers designed for successful operation at extremely low temperatures, an extinguishing liquid of this composition may be used with great advantage over extinguishing liquids containing calcium carbonate for the reason that potassium carbonate is sufficiently soluble at low temperatures, as for example within the range from zero to −40° F., to preserve in the solution a sufficient amount of the effective agent for neutralizing the acid effect of the calcium chloride and consequently for diminishing to a minimum its corrosive effect upon the metal container of the extinguisher.

I have found that an extinguishing liquid comprising a 2-1/2 gallon solution of ten pounds of calcium chloride and water in which three to four ounces of dry potassium carbonate are dissolved, gives very satisfactory results and enables such an extinguishing solution to be employed within a tin-plated copper extinguisher casing with little or no corrosive effect upon the tin-plate, thus preserving the extinguisher and maintaining it in a most perfect operating condition even though the extinguisher be not recharged for long periods of time.

Of course the acidity of the calcium chloride solution depends to some extent upon the purity of the calcium chloride itself and also upon the quantity of the acid contained therein, so that the proportion of potassium carbonate employed will be in each case sufficient to overcome or neutralize acidity of the calcium chloride solution, but with ordinary grades of calcium chloride solution I have found that the proportions above stated operate satisfactorily.

Having thus described the invention, what is claimed is:—

1. An extinguishing liquid for anti-freezing fire extinguishers comprising a solution of commercial calcium chloride and water having potassium carbonate dissolved therein.

2. An extinguishing solution for anti-freezing fire extinguishers comprising a water solution of commercial calcium chloride containing dissolved potassium carbonate, the ingredients being present in substantially the following proportions: 10 lbs. calcium chloride; 3 to 4 ounces potassium carbonate and sufficient water to produce 2-1/2 gallons of the solution.

In testimony whereof I have signed my name to this specification.

RALPH W. AUSTIN.